Jan. 20, 1931.   H. L. BLOOD   1,789,456
ARTICLE WORKING APPARATUS
Filed Nov. 16, 1927    2 Sheets-Sheet 1
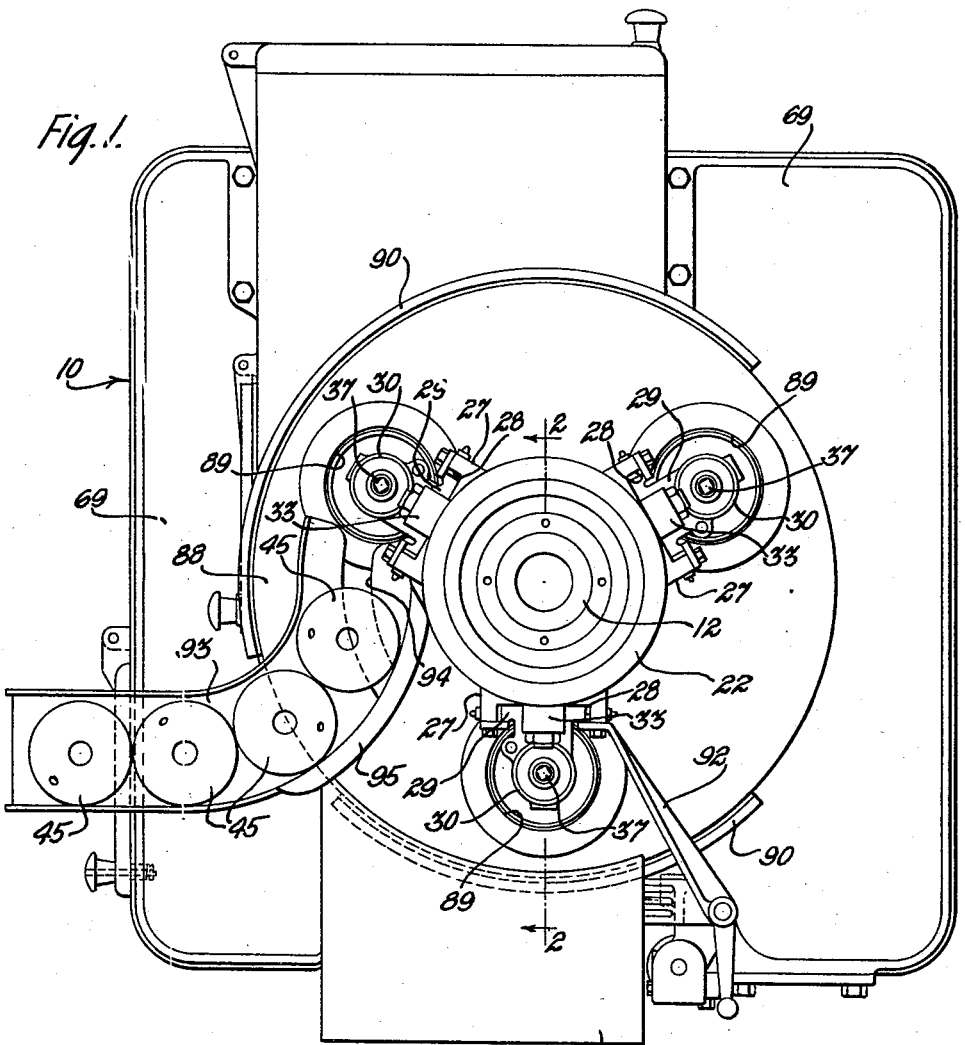
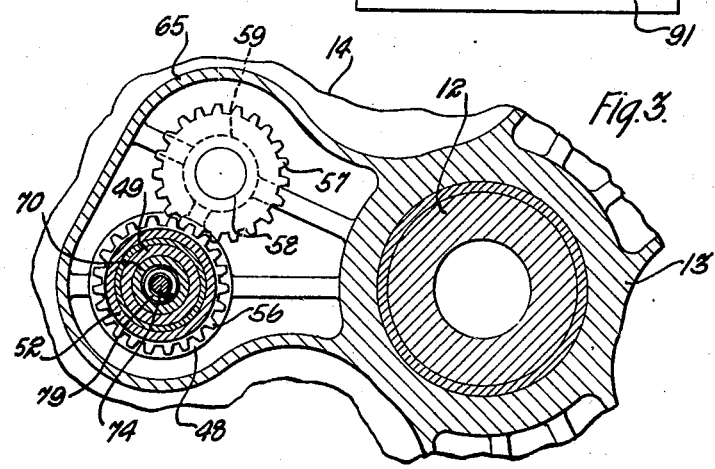
Inventor
Harold L. Blood.
by ........ Att'y.

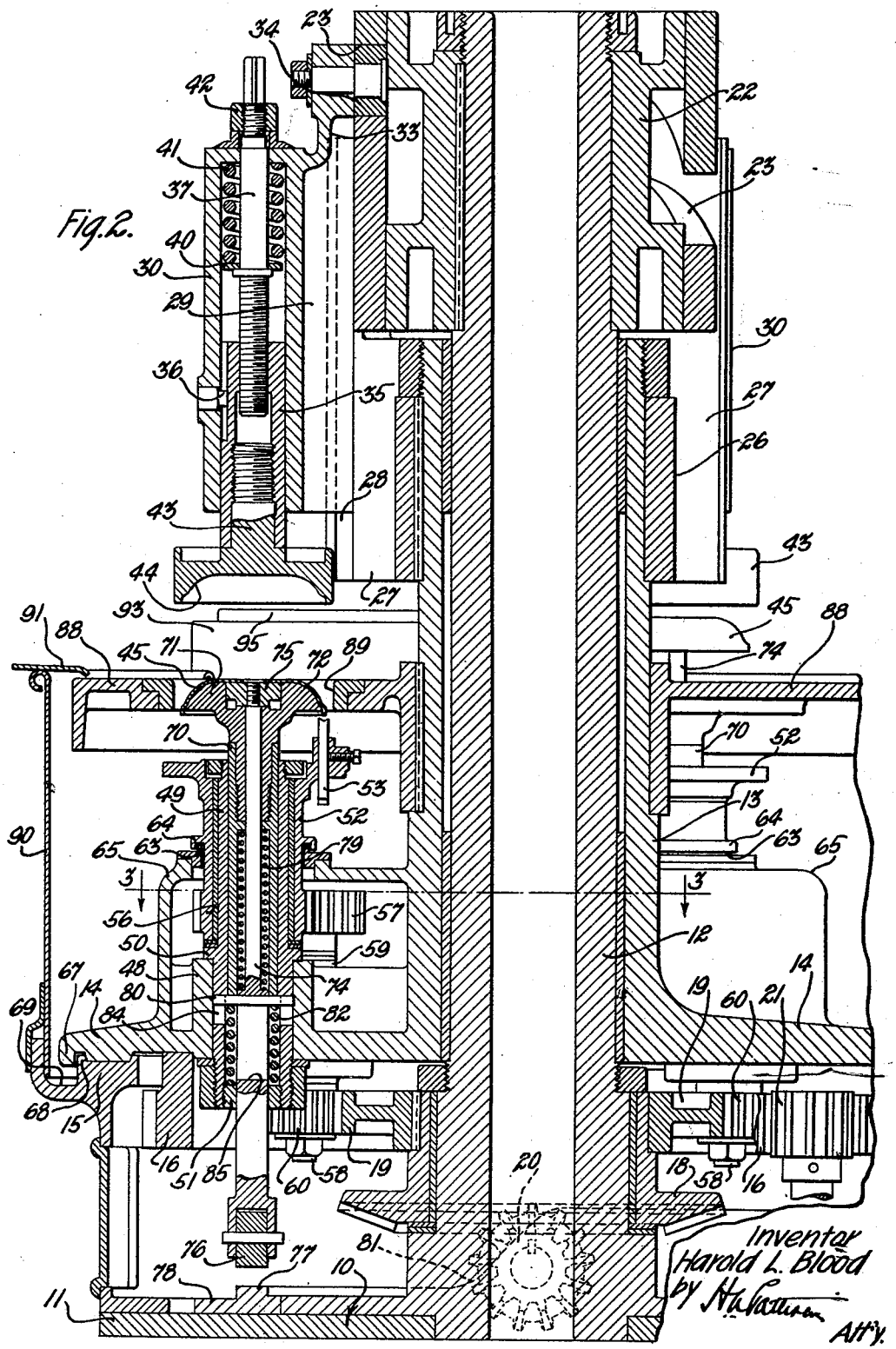

Patented Jan. 20, 1931

1,789,456

UNITED STATES PATENT OFFICE

HAROLD LANGLEY BLOOD, OF OAK PARK, ILLINOIS, ASSIGNOR TO WESTERN ELECTRIC COMPANY, INCORPORATED, OF NEW YORK, N. Y., A CORPORATION OF NEW YORK

ARTICLE-WORKING APPARATUS

Application filed November 16, 1927. Serial No. 233,728.

This invention relates to article working apparatus, and more particularly to an apparatus for trimming or forming the edges of articles.

The primary object of this invention is to provide a continuously operating article working apparatus wherein articles to be worked may be successively associated therewith, uniformly worked and automatically discharged from the apparatus in an expeditious and practical manner.

In accordance with the general features of this invention, as embodied in a multiple apparatus for trimming continuous circular edges of cup-shaped articles, there is provided a continuously rotating circular table having a plurality of sets of automatic article clamping members. The clamping members are uniformly arranged about the axis of the table and are successively operated to clamp and carry the article with the edge to be trimmed into operative engagement with a trimming tool individual to each set of clamping members. The trimming tools are arranged to continuously revolve around the axes of the clamping members and the article as the latter is carried in a circular path by the table, the article thereafter being automatically discharged from the apparatus by the separation of the clamping members followed by a movement of a stripping member coaxial with the clamping members which delivers the trimmed article onto a discharge chute.

Other objects and advantages of this invention will more fully appear from the following detailed description taken in connection with the accompanying drawings, in which Fig. 1 is a plan view of an apparatus embodying the features of this invention;

Fig. 2 is an enlarged fragmentary vertical detail section taken on the line 2—2 of Fig. 1, and Fig. 3 is a fragmentary plan section taken on the line 3—3 of Fig. 2.

Referring now to the drawings in detail, wherein like reference numerals designate similar parts, a base or frame 10 shown in plan view in Fig. 1 houses a motor and other associated driving elements which are thought to be sufficiently clear as not to require their illustration or description. Rigidly secured upon an upper horizontal portion 11 of the frame 10 is a central vertically disposed hollow stud shaft 12 (Fig. 2) upon which is rotatably journaled a sleeve 13 provided at its lower end with a circular flange 14. The flange 14 revolves at its outer under surface upon a bearing member 15 fixed to the portion 11 of the frame 10, the under surface of the flange 14 having fixed thereto a ring gear 16. Rotatably journaled upon a shouldered lower portion of the stud shaft 12 is a bevel gear 18 having fixed thereto upon an upper annular portion a gear 19 which lies within the ring gear 16. The bevel gear 18 and the ring gear 16 mesh with pinions 20 and 21, respectively, which are driven at predetermined individual speeds by the driving mechanism, previously mentioned (not shown) as being carried in the lower portion of the frame 10.

Rigidly secured upon a shoulder formed upon the upper end of the stud shaft 12 is a circular box cam 22 provided with an endless cam groove 23 extending circumferentially therearound. Fixed to the sleeve 13 immediately below the cam 22 is a collar 26 having three laterally extending arms 27 spaced 120° apart and provided on their outer vertical ends with guides or ways 28 upon which are reciprocally mounted slides 29. The slides 29 with the mechanism carried thereby to be presently described are all similar in construction and operation, so that the description of one thereof will suffice for the description of all. Referring particularly to Fig. 2 wherein one of the slides 29 is shown in vertical section, it is provided with a sleeve portion 30; the sleeve having an arm 33 at its upper end rotatably supporting a roller 34. The rollers 34 ride in the cam groove 23 and it will be apparent that as the collar 26 rotates, the rollers following in the stationary cam groove 23 will cause the slides 29 and attached sleeves 30 to rise and fall at predetermined intervals in the operation of the apparatus as determined by the associated cam groove 23.

Slidably mounted in the sleeve 30 is a clamping sleeve 35 which is secured against rotation therein by a key and keyway 36. Threaded into the upper end of the sleeve 35 is a shouldered pin 37 which at its extreme upper end is square in cross-section for the engagement of a tool for adjusting it to a proper level when setting the apparatus. Surrounding the pin 37 with its opposite ends resting between a washer 40 and a horizontal surface at the upper end of the sleeve 30 is a compression spring 41 which acts to normally draw the pin downwardly, it being limited in its movement by a nut 42 threaded onto the upper end of the pin below the squared section thereof. Threaded into the lower end of the clamping sleeve 35 is a clamping head 43 having a concave surface 44 upon its lower end designed to closely fit the upper surface of an article to be worked, in the present embodiment of this invention a telephone desk stand base 45.

The base 45, as shown in Fig. 2, comprises a metallic circular cup-like member which is generally formed by a punch press operation, which in all instances does not provide a uniform, smooth, level lower annular edge thereon which is necessary in order to support vertically the telephone apparatus to be assembled therewith and thus provide a standard type of telephone desk stand. The purpose of resiliently mounting the clamping head 43 is to prevent damage to the apparatus in case more than one desk stand base 45 should be positioned on the apparatus during the loading operation, for clamping, in which case the head 43 will move upwardly against the tension of the spring 41. In setting the apparatus the head 43 is adjusted to a predetermined level by rotating the pin 37 one way or the other, the spring 41 serving to maintain it in its adjusted position and offering enough resistance to provide a proper clamping action in the operation of the apparatus to be described hereinafter.

The upper surface of the flange 14 of the rotatable sleeve 13 is provided with three apertured bosses 48, one of which is shown in Fig. 2, each of the bosses being coaxially arranged with one of the clamping heads 43. Fixed to the boss 48 is a sleeve 49 which extends above the upper end of the boss and below the lower surface of the flange 14. A shoulder 50 on the sleeve 49 engaging the upper end of the boss 48 and a nut 51 threaded into the lower end of the sleeve serves to secure the latter to the boss. Rotatably journaled on the sleeve 49 is a tool holder 52 in the form of a tubular member which is supported at its lower end upon the shoulder 50, the upper end thereof being provided with a circular flange to which is angularly clamped a cutting tool 53, its upper cutting edge being engaged with the lower annular surface of the desk stand during the operation of the apparatus. The tool holder 52 adjacent its lower end is provided upon its peripheral surface with gear teeth forming a gear 56 which meshes with a pinion 57 fixed to the upper end of a shaft 58 journaled in a bearing 59 formed on the flange 14 of the sleeve 13, the lower end of the shaft 58 having attached thereto a pinion 60 similar to the pinion 57 and which meshes with the gear 19. Formed upon the sleeve 13 and the tubular tool holder 52 are cooperating annular flanges 63 and 64, respectively, the flange 63 being formed on a member inserted in the upper wall of a housing 65 formed on the sleeve 13. The flanges 63 and 64 and the housing 65 serve to prevent chips or grit formed by the cutting tool 53 in the operation of trimming the lower annular surface of the desk stand 45 and also any cutting lubricant which may be used from working its way between the driving elements of the apparatus. The flange 14 is also provided with a flange 67 which cooperates with a flange 68 formed upon the bearing member 15 fixed to the frame 10 for the same purpose. A trough 69 is formed upon the frame 10 for collecting chips, grit and lubricant during the trimming operation, the cutting fluid flowing by suitable means to a reservoir (not shown) carried in the frame 10.

Reciprocally mounted in the sleeve 49 is a tubular member 70 having attached at its upper end a lower clamping head 71 provided with an upper convex surface 72 which is complementary to the concave surface 44 of the head 43. Mounted reciprocally in the tubular member 70, the head 71 and the nut 51 threaded into the lower end of the sleeve 49 is a shouldered cam rod 74. The upper end of the rod 74 carries a stripping head 75 which in the normal position of the apparatus, as shown in Fig. 2, lies flush with the upper surface of the head 71 and within a suitable depression formed therein, the lower end of the rod 74 supporting a roller 76, which during the rotation of the sleeve 13 rides up an inclined portion (not shown) of a circular cam surface 77 provided on a ring 78 fixed to the portion 11 of the frame 10, which serves to lift the desk stand base 45 from the head 71 upon completion of the trimming operation, as shown at the left side of Fig. 2. The cam rod 74 with its stripping head 75 is maintained in its normal position (Fig. 2) by a compression spring 79 surrounding an upper reduced portion of the rod, opposite ends of the spring resting against a shouldered surface on the rod and a lateral apertured wall formed in the tubular member 70. A pin 80 extending laterally through the rod and the sleeve 49 serves as a stop to limit the downward movement of the rod. It will be apparent that upon the roller 76 riding up the cam surface 77, the rod 74 will be lifted and upon riding down an inclined portion 81 (Fig. 2) of the cam surface 77 the spring 79 will act to return the rod to its normal position. The lower clamping head 71 and the tubular member 70 are resiliently mounted in the sleeve 49 and are maintained in their upper or normal position by a compression spring 82 surrounding the rod 74, opposite ends of the spring resting against the nut 51 and the pin 80, the pin engaging at its outer ends the lower end of the stationary sleeve 49. Suitable slots 84 and 85 are provided in the sleeve 49 and rod 74, respectively, to permit the individual movements of the rod 74 and the tubular member 70. In the downward movement of the lower clamping head 71 the lower end of the tubular member 70 engaging the pin 80 will cause it to move downwardly in the slot 84 and thereby compress the spring 82, no relative movement occurring between the rod 74 and the pin and the slot 85 of the rod 74, as will be apparent. The head 71 is thereafter returned to its normal position, as shown in section in Fig. 2, by the spring 82 and carries with it the rod 74. In the further operation of the apparatus the rod 74 alone is raised in the manner heretofore described, the slot 85 being of sufficient length to permit the full movement thereof as determined by the cam surface 77.

Fixed to the sleeve 13 for rotation therewith is a circular table 88 provided with a plurality of circular apertures 89, each of which is arranged coaxially with one of the mechanisms heretofore described and carried upon each of the bosses 48 of the rotatable flange 14. Secured to and extending upwardly from the member 15 of the frame 10 is a circular guard plate 90 which extends at intervals above the upper surface of the table 88. Supported upon the frame 10 and the guard plate 90 at the operator's position, which is the lower side of the apparatus as viewed in Fig. 1, is a loading platform or slideway 91, which, as clearly shown in Fig. 2, is angularly disposed toward the table 88, its inner edge lying very close to the upper surface thereof. To the right of the platform 91 (Fig. 1) is pivoted a safety lever 92 which is disposed over the upper surface of the table 88 in such a manner that in the operation of the apparatus if an operator in loading the desk stand base 45 upon the traveling lower clamping head 71 should fail to remove his hand from the desk stand before the similarly traveling upper clamping head 43 starts to descend, his hand or arm will engage the lever 92 and cause it to rock about its pivot and by means of suitable link and leverage mechanism connected thereto, cause a clutch to be tripped, thereby stopping the rotation of the table and the operation of the other elements of the apparatus. A detailed illustration and description of this safety mechanism and clutch is not included because it is not believed necessary to a complete understanding of this invention.

Suitably arranged above the table 88 to the left of the loading platform 91 is a discharge chute 93 for receiving the trimmed desk stand bases 45 as they are successively stripped from the lower clamping head 71 by the elevation of the head 75 attached to the cam rod 74 in the manner hereinbefore described. The chute 93 is provided with a slot 94 which parallels the path taken by the stripping head 75 in traversing the chute, the width of the slot being such that the head 75 may freely enter, travel therealong and then pass below the chute in the operation of the apparatus. An apron 95 is fixed to the chute 93 to deflect the bases 45 delivered thereto toward the outer or left end of the chute which is inclined slightly downward, the bases passing therefrom to a receptacle (not shown) positioned on the floor.

In the operation of the apparatus an operator is positioned in front of the loading platform or slideway 91 at the lower side of the apparatus, as viewed in Fig. 1. The apparatus is set in operation and by means of the pinions 21 and 20 the gears 16 and 18 are caused to rotate, the gear 16 being fixed to the sleeve 13 which carries the table 88, causes the latter to rotate in a counterclockwise direction. Thus the plurality of sets of reciprocal non-rotatable clamping heads 43 and 71 mounted upon the upper end of the sleeve and the flange 14 thereof, respectively, are also revolved around the axis of the stud shaft 12 in a counter-clockwise direction. The rotation of the gear 18 and attached gear 19 is transmitted to each of the tool holders 52, which are revolved around the axis of the clamping heads 43 and 71 in a counter-clockwise direction by means of the pinions 60 and 57 individual to each tool holder. The operator as each set of clamping heads approach the loading position after passing the discharge chute 93 and before the set leaves the lowermost position thereof at the lower side of Fig. 1 slides a desk stand base 45 along the stationary inclined slideway 91 and onto the rotating table 88 and thence onto the lower clamping head 71 into the position shown in Fig. 2. As each set of loaded clamping heads pass to the right of the safety lever 92 the roller 34 operatively associated with the upper head 43 rides down the stationary cam groove 23, thus moving the head 43 downwardly to firmly clamp the desk stand base 45 between the heads 43 and 71, the movement being such that the clamping head 71 is depressed against the tension of the spring 82, the annular edge of the base 45 thus being brought into engagement with the revolving cutting tool 53, thereby trimming it to remove all burrs and providing a level lower surface thereof. The cam groove 23 is so shaped that during substantially a 180° rotation of the table 88 the upper head 43 is lowered and returned to its normal level, the lowering movement beginning when its axis is over the safety lever 92 and is returned to its normal level at a point between the two upper sets of clamping heads (Fig. 1). The trimming operation it will be understood occurs at a point intermediate the low and high points of the cam groove 23, a suitable dwell being provided in the cam groove. After the trimming operation and upon the head 43 returning to its normal position, as just described, the roller 76 rides up an inclined portion of the cam surface 77, thus raising the cam rod 74, the stripping head 75 being raised from the depression in the lower head 71 and carrying with it the trimmed base 45 to the level shown at the left side of Fig. 2. In the continued rotation of the table 88 the rod 74 enters the slot 94 of the discharge chute 93 with the head 75 and the trimmed edge of the base 45 on a plane above the upper surface of the chute, the trimmed edge slightly clearing it, thereafter the roller 76 rides down the inclined portion 81 of the cam surface 77, the head 75 being lowered below the slot 94 of the chute 93 before reaching the inner end of the slot adjacent the deflecting apron 95 and finally into the depression in the lower clamping head 71 (Fig. 2). As the head 75 descends it will be apparent that the base 45 will be deposited on the discharge chute 93 where successive deliveries thereof form a train, one pushing the other until they finally fall from the left end of the chute into a receptacle (not shown). This completes a cycle of operations from the delivery of a base 45 onto any one of the lower clamping heads 71, the trimming thereof and its delivery to the chute 93.

Although the invention has been disclosed and described as applied to an apparatus for trimming or working a particular article, it is clear that it may have a more general application, and that modifications can be made without departing from the spirit and scope of the appended claims.

What is claimed is:

1. In an apparatus for working articles, article supporting means, article working means revolvable about the supported article, means for effecting a relative movement between the article and the revolvable working means to work the article, means for stripping the worked article from the supporting means, means positioned at a plurality of points of the stripping means during a return movement thereof for receiving the worked article therefrom, and means for effecting a relative movement between the article stripping and receiving means for positioning the article for reception by the latter means during the return movement of the stripping means.

2. In an apparatus for working articles, article supporting means, article working means revolvable about the supported article, means for effecting a relative movement between the article and the revolvable working means to work the article, means having a reciprocative movement within the supporting means for stripping the worked article therefrom, and bifurcated means between the furcations of which the reciprocative means travels during a return movement thereof and upon which the worked article is deposited.

3. In an apparatus for working articles, laterally movable article supporting means, article working means revolvable about the supported article, means for effecting a relative movement between the article and the revolvable working means to work the article, vertically reciprocative and laterally movable means arranged coaxial with the supporting means for stripping the worked article therefrom, and stationary means associated with the reciprocative means during a return movement thereof for receiving the article therefrom.

4. In an apparatus for working articles, reciprocative article supporting and clamping members, article working means revolvable about and adjacent a surface of the article to be worked, means for effecting relative movements between the members and the working means to cause a clamping of the article to the supporting member and thereafter an operative association of the article with the revolvable working means, and means for stripping the worked article from the supporting member during a relative return movement of the supporting and clamping members.

5. In an apparatus for working articles, article supporting and clamping means, article working means revolvable about the clamped article and rotatable about its own axis, means for effecting in a continuous movement a clamping of the article to the supporting means and then an operative association of the article with the revolvable and rotatable working means to cause a working thereof, and a stripper mechanism for moving the worked article from the supporting means.

6. In an apparatus for working articles, continuously revolving and reciprocating article supporting and clamping means, article working means revolvable about the clamped article and disposed in the path of the article during a reciprocation thereof, vertically reciprocative means for removing the worked article from the supporting means, and a member operatively associated therewith during a return reciprocative movement thereof for receiving the worked article therefrom.

7. In an apparatus for working articles, coaxially aligned reciprocative article supporting and clamping members, article working means revolvable about the axis of the clamped article and adjacent a surface thereof to be worked, means for moving the clamping member to cause a clamping of the article to the supporting member and thereafter the article into engagement with the working means and for returning the members to their normal position, and reciprocative means arranged within an aperture provided in the supporting means for stripping the worked article therefrom during a return movement of the supporting and clamping members.

8. In an apparatus for working cup-shaped articles, a continuously rotating member, a plurality of article supporting and clamping means uniformly arranged thereon, article working means individual to and revolvable about the axis of each supporting and clamping means and adjacent an annular surface of the article, means for effecting a relative movement between a clamped article and the associated working means to work the article, means, normally nested within an aperture provided in the supporting means for removing the worked article from the supporting and clamping means, and means for rotating the member and for operating the several means in a predetermined sequence to complete a cycle of operations common to each set of supporting and clamping means and its working means.

9. In an apparatus for working articles, article supporting and clamping means, article working means revolvable about the axis of a clamped article, and means for continuously moving the clamping means to clamp an article upon the support and to move without interruption the article and the support into operative association with the revolvable working means to cause a working of the article.

10. In an apparatus for working articles, coaxially aligned reciprocative article supporting and clamping members, article working means revolvable about the axis of a clamped article and normally spaced from a surface thereof to be worked, and means for successively moving the clamping member to clamp the article upon the support and thereafter causing the article carried by the support to engage the working means to cause a working of the article.

11. In an apparatus for working articles, coaxially aligned reciprocative article supporting and clamping members, article working means revolvable about the axis of a clamped article and normally spaced from a surface thereof to be worked, and means for moving the clamping member longitudinally of its axis to clamp the article upon the support and thereafter by a similar continuing movement causing the article carried by the support to engage the working means to cause a working of the article.

In witness whereof, I hereunto subscribe my name this 5th day of November A. D., 1927.

HAROLD LANGLEY BLOOD.